(12) United States Patent
Didey

(10) Patent No.: US 10,384,768 B2
(45) Date of Patent: Aug. 20, 2019

(54) LANDING GEAR DRIVE SYSTEM AND METHOD

(71) Applicant: AIRBUS OPERATIONS LIMITED, Bristol (GB)

(72) Inventor: Arnaud Didey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 328 days.

(21) Appl. No.: 15/125,595

(22) PCT Filed: Mar. 13, 2015

(86) PCT No.: PCT/GB2015/050741
§ 371 (c)(1),
(2) Date: Sep. 13, 2016

(87) PCT Pub. No.: WO2015/136303
PCT Pub. Date: Sep. 17, 2015

(65) Prior Publication Data
US 2017/0001718 A1 Jan. 5, 2017

(30) Foreign Application Priority Data
Mar. 14, 2014 (GB) .................................. 1404609.8

(51) Int. Cl.
*B64C 25/40* (2006.01)
*B64C 25/34* (2006.01)
*B64C 25/42* (2006.01)

(52) U.S. Cl.
CPC ............ *B64C 25/405* (2013.01); *B64C 25/34* (2013.01); *B64C 25/42* (2013.01); *Y02T 50/823* (2013.01)

(58) Field of Classification Search
CPC ....... B64C 25/405; B64C 25/42; B64C 25/34; Y02T 50/823
See application file for complete search history.

(56) References Cited

U.S. PATENT DOCUMENTS

2005/0224642 A1* 10/2005 Sullivan ................... B60L 7/26
244/111
2006/0065779 A1 3/2006 McCoskey et al.
(Continued)

FOREIGN PATENT DOCUMENTS

WO 2011023505 A2 3/2011
WO 2012098198 A2 7/2012
(Continued)

OTHER PUBLICATIONS

International Search Report and Written Opinion of the ISO dated Jun. 1, 2015 in International Application No. PCT/GB2015/050741.

*Primary Examiner* — Valentina Xavier
(74) *Attorney, Agent, or Firm* — Nixon & Vanderhye P.C.

(57) ABSTRACT

A drive system for an aircraft landing gear is disclosed having a wheel rotatable about a wheel axis, a driven gear arranged to be attached to the wheel and capable of rotating the wheel about the wheel axis, a drive train comprising an input gear rotatable by an input shaft, an intermediate gear meshed with the input gear and rotatable by an intermediate shaft, and a support member arranged to support the input shaft and intermediate shaft. The support member is arranged to pivot about the input shaft between a neutral configuration in which the drive train is disengaged from the driven gear and a driven configuration in which the drive train is engaged with the driven gear to enable the drive train to rotate the driven gear. The drive system includes brake capable of being engaged with the input shaft to prevent rotation of the input shaft relative to the support member and of being disengaged from the input shaft to permit rotation of the input shaft relative to the support member.

14 Claims, 5 Drawing Sheets

(56) References Cited

U.S. PATENT DOCUMENTS

| | | |
|---|---|---|
| 2012/0312112 A1 | 12/2012 | Tizac |
| 2013/0026284 A1 | 1/2013 | Christensen et al. |
| 2013/0327884 A1 | 12/2013 | Yiu |
| 2014/0158820 A1 | 6/2014 | Wilson et al. |
| 2014/0225421 A1 | 8/2014 | Oswald et al. |
| 2014/0245853 A1 | 9/2014 | Didey |
| 2015/0210385 A1* | 7/2015 | Didey .................. B64C 25/405 244/50 |
| 2017/0121014 A1* | 5/2017 | Cox ..................... B64C 25/405 |

FOREIGN PATENT DOCUMENTS

| | | |
|---|---|---|
| WO | 2012171589 A1 | 12/2012 |
| WO | 2014023939 A1 | 2/2014 |
| WO | 2014023941 A1 | 2/2014 |

\* cited by examiner

LANDING GEAR DRIVE SYSTEM AND METHOD

RELATED APPLICATIONS

The present application is a National Phase of International Application Number PCT/GB2015/050741, filed Mar. 13, 2015, which claims priority from Great Britain Application Number 1404609.8, filed Mar. 14, 2014.

FIELD OF THE INVENTION

The present invention relates to a drive system and method for rotating one or more wheels of an aircraft landing gear for the purposes of ground taxiing, in which a separate actuator for moving the drive system into and out of engagement with the one or more wheels is not needed.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations.

Several autonomous ground taxi systems have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. US2012/0312112 discloses a motorised mechanism for an aircraft landing gear wheel comprising a declutchable interface between the motorised mechanism and the wheel.

SUMMARY OF THE INVENTION

A first aspect of the invention provides a drive system for an aircraft landing gear having a wheel rotatable about a wheel axis, the drive system including:
- a driven gear arranged to be attached to the wheel so as to be capable of rotating the wheel about the wheel axis;
- a drive train comprising an input gear rotatable by an input shaft, an intermediate gear meshed with the input gear and rotatable by an intermediate shaft, and a support member arranged to support the input shaft and intermediate shaft and arranged to pivot about the input shaft between a neutral configuration in which the drive train is disengaged from the driven gear and a driven configuration in which the drive train is engaged with the driven gear to enable the drive train to rotate the driven gear; and
- a brake capable of being engaged with the input shaft to prevent rotation of the input shaft relative to the support member and of being disengaged from the input shaft to permit rotation of the input shaft relative to the support member,
wherein the support member is arranged to pivot from the neutral configuration to the driven configuration upon application of a first torque to the input shaft when the brake is engaged with the input shaft.

In this way, the drive system can be moved from a neutral configuration, in which there is no connection between the drive system and the landing gear wheel so that the wheel can rotate freely (e.g. during take-off or landing), to a driven configuration, in which the drive system can rotate the wheel (e.g. during ground taxiing operations), simply by applying a torque to the input shaft. There is therefore no need for a separate device or mechanism for moving the drive train into engagement with the driven gear, and therefore no need to maintain such a device or mechanism. The risk of malfunction of the drive system is likewise reduced.

In preferred embodiments of the first aspect the brake is arranged to disengage from the input shaft upon application of a second torque to the input shaft, the second torque being higher than the first torque. Thus, the brake can be automatically disengaged simply by applying the second, higher, torque to the input shaft.

The brake may comprise any suitable device capable of engaging with the input shaft to prevent rotation thereof, and disengaging to permit such rotation. Suitable devices may include any braking system or a clutch. In preferred embodiments the brake comprises a torque limiter arranged to disengage from the input shaft upon application of a second torque higher than a threshold torque to the input shaft, wherein the first torque is lower than the threshold torque. Thus, the engagement and disengagement of the brake can be automatically controlled by control of the torque applied to the input shaft by e.g. a motor.

The input shaft and intermediate shaft are preferably arranged with respect to one another such that the resultant force caused by the engagement between the drive path and the driven gear in the driven configuration provides a moment about the input shaft which acts to urge the support member towards the driven configuration.

The driven gear preferably has a larger diameter than the drive pinion. This arrangement provides for a torque-magnifying gear ratio and an efficient use of space. The intermediate gear preferably has a larger diameter than the input gear to provide for a further torque-magnifying gear ratio.

The support member is preferably arranged to pivot about the input shaft between the neutral configuration, the driven configuration, and a reverse driven configuration in which the drive train is engaged with the driven gear to enable the drive train to apply torque to the driven gear in a reverse direction. Thus, the drive system can provide reverse motion or can provide a braking effect to slow forward motion. The driven configuration and reverse driven configuration may comprise different engagement positions between the drive train and the driven gear.

In some embodiments the drive system may comprise a pinion gear mounted on the intermediate shaft so as to be rotatable in tandem with the intermediate gear, the pinion gear being arranged to mesh with the driven gear in the driven configuration of the support member. Preferably, one of the pinion gear and the driven gear comprises a roller gear and the other of the pinion gear and the driven gear comprises a sprocket, the roller gear comprising a series of rollers arranged to form a ring, each roller being rotatable about a roller axis at a fixed distance from an axis of rotation of the drive pinion or driven gear, respectively.

A key advantage of achieving the motor-wheel connection via a sprocket and roller gear is that such a mechanism is inherently robust and tolerant of environmental contamination. Thus, it may not be necessary to enclose the drive system within a casing to prevent ingress of debris and other contaminants. In contrast, drive system arrangements employing meshing toothed gears, such as that disclosed in WO2011/023505, must generally be suitably protected from contaminants, the required protective casing adding both weight and expense, and making routine inspection difficult.

Another advantage of the sprocket-roller arrangement is that it is more tolerant of wheel deformation and misalignment between pinion and driven gear than meshing toothed gear arrangements. Landing gear wheels are subject to high loads and consequential deformation during ground taxiing, and a driven gear fixed to the wheel will inevitably deform in response to such wheel deformation. Moreover, such loads may introduce misalignment between the wheel and the drive system. Meshing toothed gears are typically intolerant of such deformation and a typical toothed rim gear may need to be isolated from the wheel via bearings, a flexible interface, or similar. In contrast, the sprocket and roller arrangement of the present invention may be able to tolerate the deformation without such modification.

A further advantage is that roller gear-sprocket transmissions may suffer less wear during use than toothed gear transmissions, since the engagement is via a rolling contact rather than a sliding contact.

In some embodiments each of the series of rollers may be rotatable about a pin, the pins optionally being supported by an annular support member, or between two annular support members. Such an arrangement has the advantage of being lightweight and having high structural strength. Optionally, the roller gear may comprise a bush between each roller and pin.

In other embodiments the series of rollers may be provided by a roller chain (also known as an attachment chain, or attachment roller chain) extending around an outer circumference of a support member and being fixed thereto. This arrangement may be less expensive to implement than the roller gear arrangement discussed above. Roller chains are typically utilised so that they extend around one or more sprocket wheels so that the chain is movable relative to those sprocket wheels. By arranging the roller chain so that it is fixed to the support member the roller chain is not required to flex (i.e. there is no relative movement between neighbouring links) and thus the chain is subject to less wear. This in turn leads to a longer useful life of the chain and reduced maintenance costs. Moreover, the roller chain is less likely to become detached from the support member in the event of a failure. However, a small risk of chain detachment remains, making roller chain embodiments potentially less preferred than roller gear embodiments.

In alternative embodiments, the intermediate gear comprises a pinion gear arranged to mesh with the driven gear in the driven configuration of the support member. Preferably, the intermediate gear and the driven gear each comprise a toothed spur gear.

In any embodiments of the first aspect the support member preferably comprises a housing enclosing the input gear and intermediate gear. The housing thus serves to protect the input gear and intermediate gear from environmental contamination that may lead to jamming or other performance faults. Environmental contamination may comprise debris thrown up from the runway or apron during movement of the aircraft, for example.

A second aspect of the invention provides an aircraft landing gear comprising a wheel and a drive system according to the first aspect, wherein the driven gear of the drive system is attached to the wheel so that the wheel is arranged to rotate in tandem with the driven gear.

A third aspect of the invention provides a method of operating a drive system to drive the wheel of an aircraft landing gear, the drive system including:
  a driven gear attached to the wheel so as to be capable of rotating the wheel; and
  a drive train comprising an input gear rotatable by an input shaft, an intermediate gear meshed with the input gear and rotatable by an intermediate shaft, and a support member arranged to support the input shaft and intermediate shaft and arranged to pivot about the input shaft between a neutral configuration in which the drive train is disengaged from the driven gear and a driven configuration in which the drive train is engaged with the driven gear;
  the method including the sequential steps of;
  (i) preventing rotation of the input shaft;
  (ii) applying a first torque to the input shaft to cause the support member pivot from the neutral configuration to the driven configuration; and
  (iii) enabling rotation of the input shaft to cause the drive train to rotate the driven gear.

The third aspect is subject to the same advantages as discussed above in relation to the second aspect.

Step (iii) preferably comprises applying a second torque to the input shaft in the driven configuration to enable rotation of the input shaft and thereby cause the drive train to rotate the driven gear, the second torque being higher than the first torque. Thus, rotation of the input shaft can be enabled easily and automatically by applying the second, higher, torque to the input shaft.

The method may include the further step of ceasing to apply torque to the input shaft to cause the support member to pivot from the driven configuration to the neutral configuration. Thus, disengagement of the drive system from the wheel can be easily and automatically be achieved by stopping application of torque to the input shaft.

The method may further include the step of applying a third torque to the input shaft in a direction opposite to the first torque to cause the support member to pivot from the neutral configuration to a reverse driven configuration in which the drive train is engaged with the driven gear to enable the drive train to apply torque to the driven gear in a reverse direction. Thus, the drive system can be operated to provide either reverse motion of the wheel or a braking effect to forward motion of the wheel.

Any of the optional or preferred features, and their associated advantages, discussed above in relation to the various aspects of the invention can be applied to any aspect of the invention, either alone or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
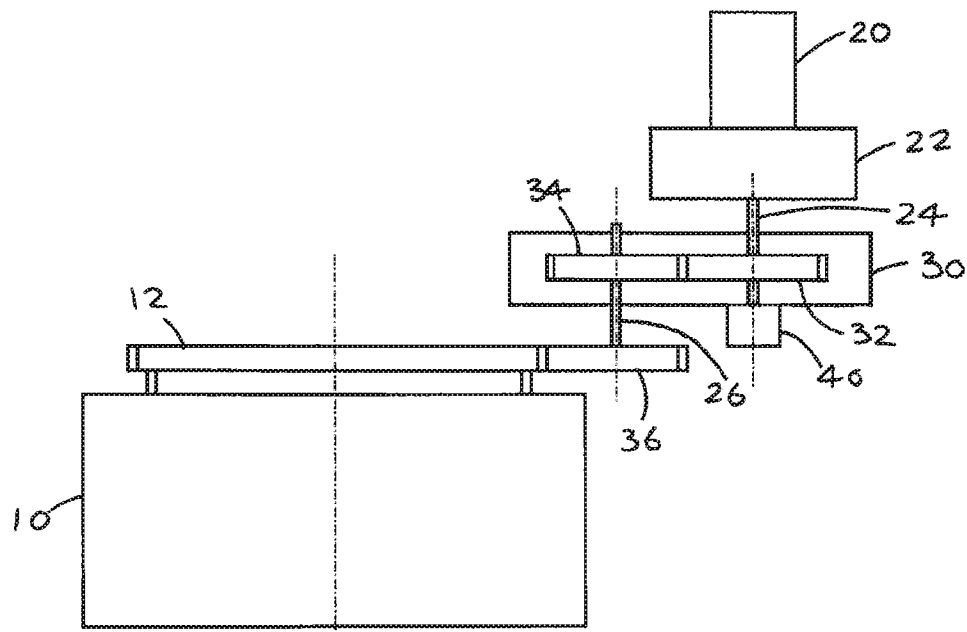
FIG. 1 shows a schematic representation of the architecture of a landing gear drive system according to a first embodiment of the invention.
Figure 2:
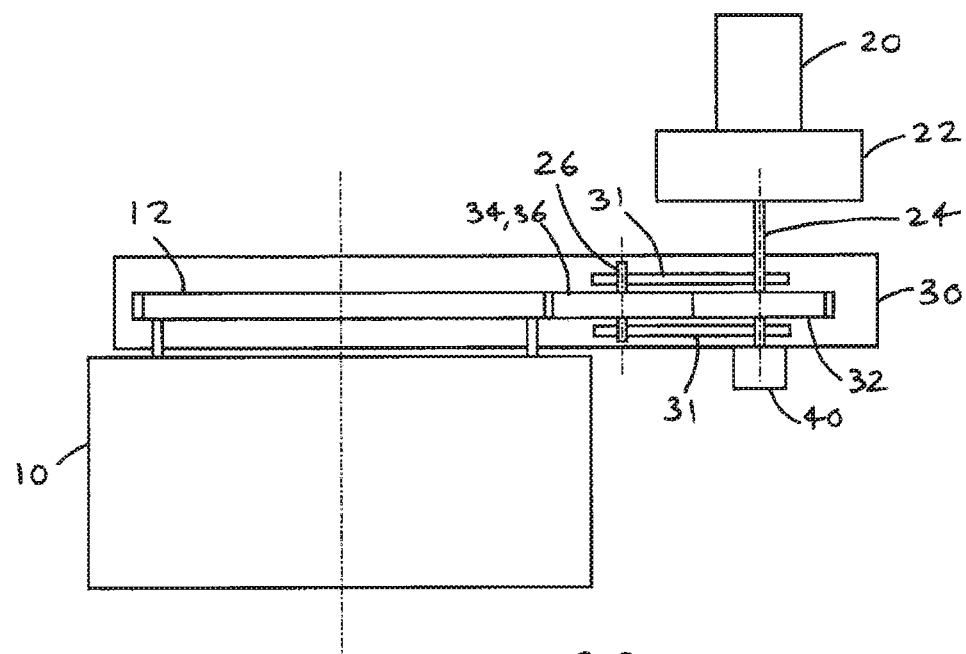
FIG. 2 shows a schematic representation of the architecture of a landing gear drive system according to a second embodiment of the invention.

FIGS. 1 and 2 schematically illustrate first and second embodiments, respectively, of a drive system for rotating the wheel of an aircraft landing gear. Many features of the two embodiments are identical, and these common features will be given common reference numbers.

The principles of the embodiments may be applied to landing gear with two wheels, or with four or more wheels. The landing gear is preferably a main landing gear (i.e. a landing gear attached to wing structure or fuselage structure in the region of the centre of gravity of the aircraft and/or in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft).

The landing gear (not shown) includes a telescopic shock-absorbing main leg, including an upper telescopic part (main fitting) and a lower telescopic part (slider). The upper telescopic part is attached to the aircraft fuselage or wing (not shown) by its upper end. The lower telescopic part supports an axle carrying a pair of wheels 16, one on either side of the main leg (only one wheel 10 is shown in FIGS. 1 and 2, for clarity). The wheels 10 are arranged to rotate about the axle to enable ground movement of the aircraft, such as taxiing or landing. Each wheel 10 comprises a tyre (not shown) supported by a rim (also known as a hub).

The drive system according to the first embodiment, as shown in FIG. 1, comprises an electric motor 20 which rotates an input shaft 24 via a gearbox 22, which may comprise any suitable gearing arrangement such as an epicyclic gearbox. An input gear 32 is mounted on the input shaft 24 so as to be rotatable therewith. The input gear 34 is in permanent mesh with an intermediate gear 34 which is mounted on an intermediate shaft 26. The input gear 32 and the intermediate gear 34 each comprise toothed spur gears having an appropriate tooth profile, such as an involute tooth profile. Also mounted on the intermediate shaft 26 is a pinion gear 36 which rotates in tandem with the intermediate gear 34 on rotation of the intermediate shaft 26. This arrangement provides for rotation of the pinion gear 36 in response to rotation of the input gear 32.

The drive system includes a driven gear 12 which is attached to the wheel 10 so as to be capable of rotating the wheel about its axis. The attachment between the driven gear 12 and the wheel 10 may be via a rigid or flexible connection, which may comprise a continuous ring or a plurality of coupling members.

The input gear 32 and intermediate gear 34 are enclosed within a housing 30 to protect them from environmental contamination such as debris from the runway. The input shaft 24 and intermediate shaft 26 are supported by bearings or bushes (not shown) located in the walls of the housing 30. The housing is able to pivot about the input shaft 24, so that the intermediate shaft 26 is movable in an arc around the input shaft 24. This arrangement enables the drive pinion 36 to pivot into and out of engagement with the driven gear 12, as discussed further below. In alternative embodiments the housing 30 may comprise a support member which has the functions of supporting the input shaft 24 and intermediate shaft 26 and being pivotable about the input shaft 24, but does not necessarily enclose the input gear 32 and intermediate gear 34.

A torque limiter 40 is mounted on the housing 30 (or support member) and able to engage with the input shaft 24 to prevent rotation of the input shaft 24 within its bearings. When the torque limiter 40 is disengaged from the input shaft 24 the input shaft 24 is able to rotate freely. The torque limiter 40 is configured to be engaged when the torque applied to the input shaft 24 by the motor 20, via the gearbox 22, is lower than a threshold torque, and to disengage when the torque exceeds the threshold torque. Thus, the torque limiter 40 acts as a brake to either prevent or permit rotation of the input shaft 24. In alternative embodiments the braking function may be provided by a clutch or any other suitable braking device, such as a frictional braking device.

The torque limiter 40 is preferably arranged to automatically reset after each time the torque threshold is exceeded, so that it can continue to detect such threshold exceeding events without external input. However, in some embodiments it may be necessary to actively reset the torque limiter. Such resetting may be achieved by using a sensor (not shown) to detect when the drive pinion 36 has disengaged from the driven gear 12, and a signalling device to provide a reset signal to the torque limiter 40 when the sensor has detected such disengagement. This is only one example of many different ways in which the torque limiter may be reset.

Figure 8:
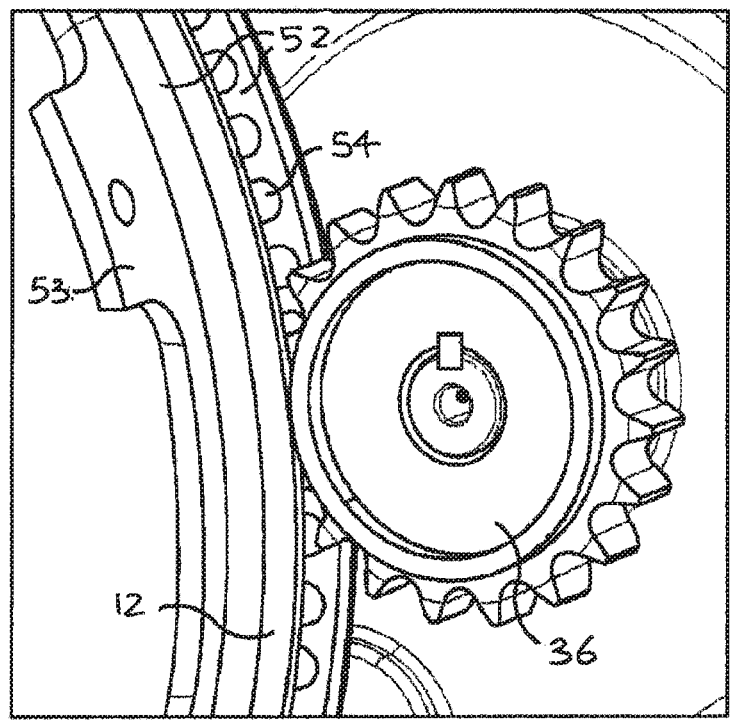
FIG. 8 shows a possible configuration for the pinion gear and driven gear of the first embodiment.
Figure 9:
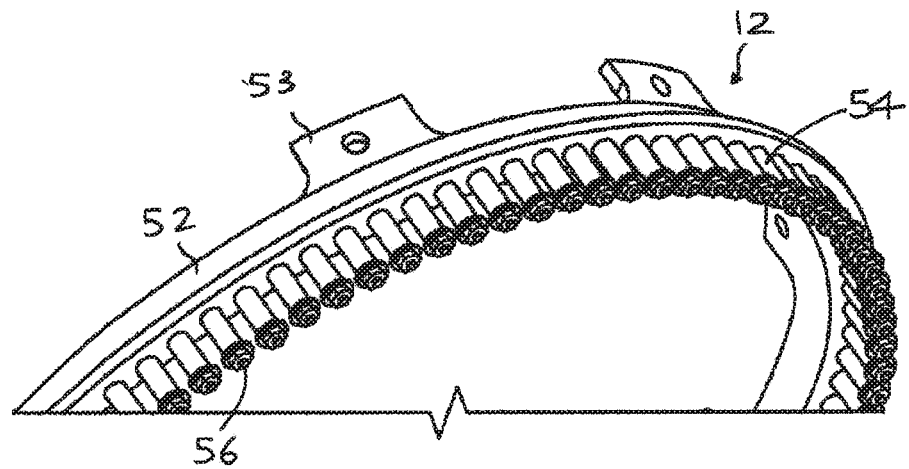
FIGS. 9 to 13 show possible configurations for the driven gear or pinion gear of the first embodiment.
Figure 10:
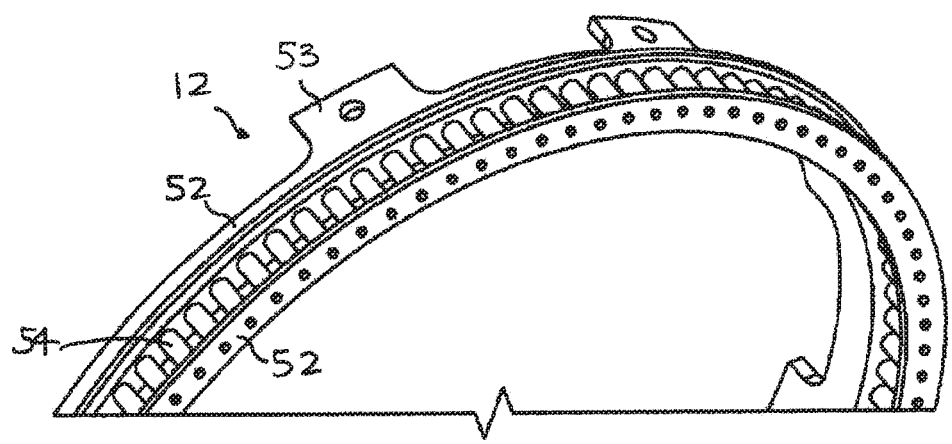

In the first embodiment the driven gear 12 comprises a roller gear and the pinion gear 36 comprises a sprocket, as shown in FIGS. 8-10. As shown in FIGS. 8 and 10, the roller gear may be formed by two rigid annular rings 52 connected together by a series of rollers 54 extending around the rings to form a continuous track. The rollers 54 are each rotatable about a pin (not visible) which extends between the annular rings 52 to form a rigid connection between the annular rings 52. One of the annular rings 52 comprises a plurality of connection extension tabs 53 which provide a rigid connection to the wheel 10. The plurality of extension tabs 53 may be replaced by a single continuous ring extension attached to the wheel 10 by bolting or by any other suitable rigid or flexible coupling arrangement. In further alternative embodiments the connection to the wheel 10 may be via a flexible interface comprising a plurality of attachment couplings permitting relative movement in one or more dimensions between the wheel 10 and the driven gear 12. A suitable roller gear is a pin gear drive unit no. PDU35, supplied by Tsubaki™. In two wheel drive arrangements the roller gear may comprise such a pin gear drive unit with two rows of rollers, while a pin gear drive unit with a single row of rollers may be sufficient for a four wheel drive arrangements.

Alternatively, as shown in FIG. 9, the roller gear may comprise only one rigid annular ring 52, and each roller 54 may be supported on a pin (not visible) attached at only one end to that annular ring 52 so as to be cantilevered, the other end of the pin being provided with a nut and washer arrangement 56, or similar, to retain the roller 54.

Figure 11:
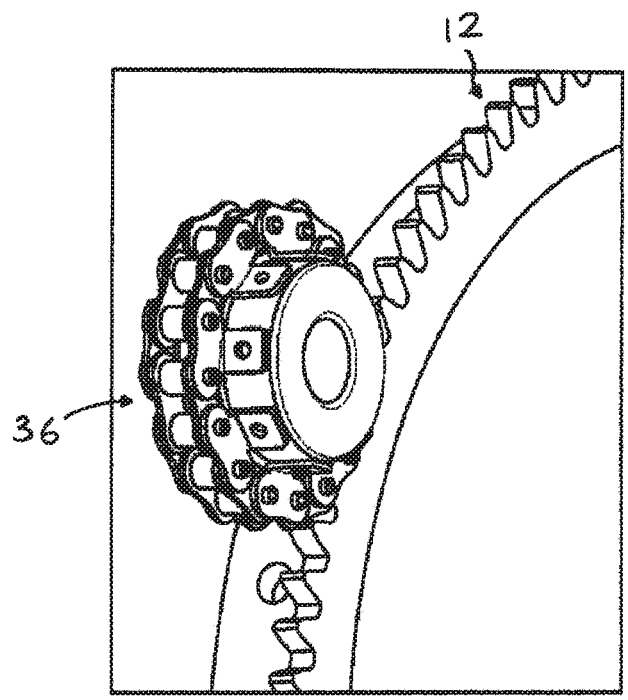
Figure 12:
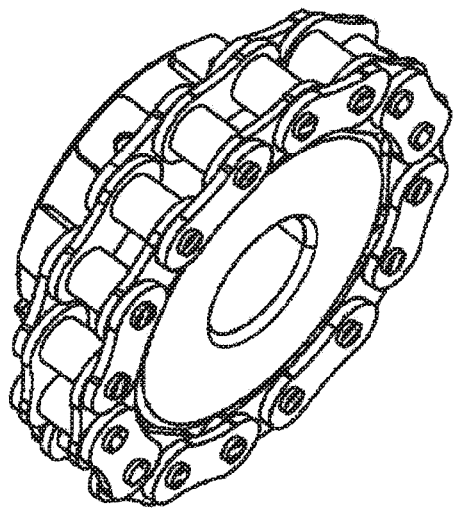
Figure 13:
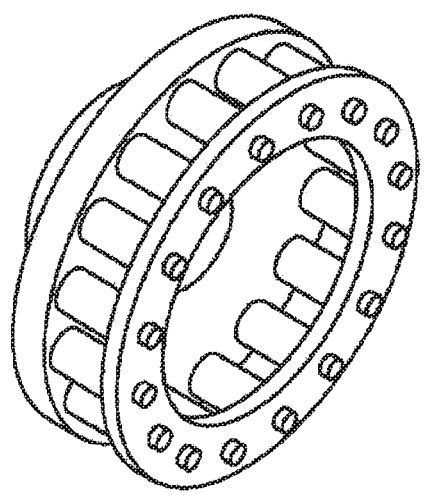

In further variations of the first embodiment, the driven gear 12 comprises a sprocket and the pinion gear 36 comprises a roller gear, as shown in FIGS. 11-13. The roller gear may be of the type described above in relation to the driven gear 12, and as shown in FIG. 13, or may comprise a roller chain wrapped around and Used to a cylindrical base, as shown in FIGS. 11 and 12. The roller chain variant of the roller gear may be applied to embodiments in which the driven gear 12 comprises the roller gear.

The drive system of the first embodiment also includes various other components and features which will not be described in detail here, including seals to seal the housing 30 and the casings of the motor 20 and gearbox 22. The drive system will also comprise stops to limit the amount by which the housing 30 can pivot, and one or more springs to bias the housing 30 to the neutral configuration, as discussed below.

Operation of the drive system of the first embodiment will now be described with reference to FIGS. 3 to 6, which provide schematic representations of the various stages of operation.

The drive system is biased to a neutral configuration, in which there is no engagement between the drive pinion 36 and the driven gear 12 and the torque limiter 40 is engaged, by a pair of springs 33A, 33B. In this neutral configuration the wheel 10 can rotate freely, e.g. during take-off or landing. The springs 33A, 33B may comprise compression springs, tension springs, leaf springs, or any other suitable resilient device.

Figure 3:
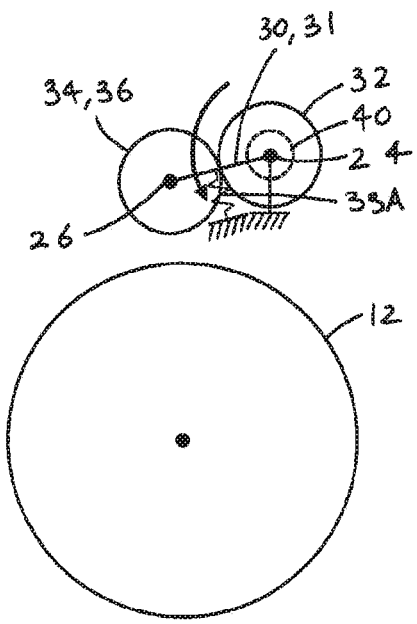
FIGS. 3 to 6 show various stages in the operation of a landing gear drive system according to the first or second embodiment.

FIG. 3 illustrates t e first step for initiating forward motion (right to left in FIGS. 3 to 6). The torque limiter 40 is engaged so that rotation of the input shaft 24 is prevented, and a torque below the torque threshold is applied to the input shaft 24 in a first direction (anti-clockwise in FIG. 3) by the motor 20 via the gearbox 22. Since the input shaft 24 is prevented from rotating, the torque instead causes the housing 30 to pivot about the input shaft in the first direction, as indicated by the arrow in FIG. 3.

Figure 4:
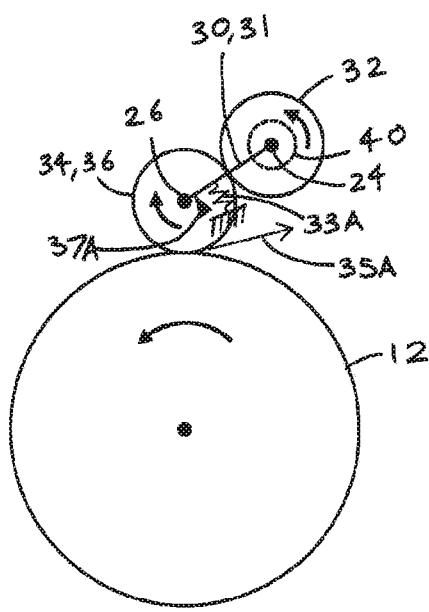

Gradually, the housing 30 pivots to a position in which the drive pinion 36 is meshed with the driven gear 12, as shown in FIG. 4. In this position the torque applied to the input shaft 24 by the motor 20 is increased to a level above the torque threshold so that the torque limiter 40 is disengaged and the input shaft 24 is able to rotate within the housing. As indicated by the arrows in FIG. 4, the rotation of the input shaft 24 in the first direction thus causes rotation of the input gear 32 in the first direction and rotation of the intermediate gear 34 and drive pinion 36 in a second direction (clockwise in FIG. 4) opposite to the first direction. Since the drive pinion 36 is meshed with the driven gear 12, the driven gear 12—and thus the wheel 10—is rotated in the first direction to provide forward motion of the wheel 10.

The meshing engagement is maintained because the resultant force derived from the engagement between the drive pinion 36 and the driven gear 12 provides a moment about the axis of the input shaft 24 in the first direction, which thus serves to urge the drive pinion 36 towards the driven gear 12. That is, the resultant force has a direction vector 35A which passes between the axis of the input shaft 24 and the axis of the driven gear 12 (or wheel 10) to provide the required moment. This moment is sufficiently large to overcome the opposite moment in the second direction which is provided by the spring 33A as it acts to urge the housing 30 to the neutral configuration, as shown in FIG. 4.

The distance between the axis of the drive pinion 36 and the driven gear 12 in the forward driven configuration is controlled by a stop 37A, which prevents this axis centre distance from becoming too short. Without such control, jamming of the gears is possible.

To disengage the drive pinion 36 from the driven configuration and return to the neutral configuration, the motor 20 ceases to apply any torque (or applies a torque below the torque threshold) to the input shaft 24. The torque limiter 40 responds by engaging to prevent rotation of the input shaft 24. The biasing torque applied by the spring 33A in the second direction is greater than the engagement torque supplied by the resultant forces between the drive pinion 36 and the driven gear 12 in the first direction, so that these gears become unmeshed and the housing 30 pivots in the second direction to return to the neutral configuration.

Figure 5:
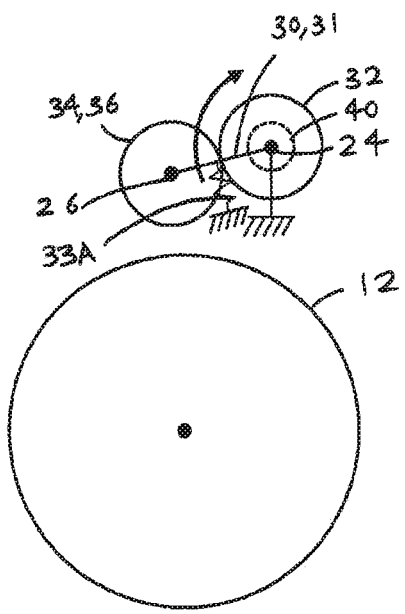

FIG. 5 illustrates the first step for initiating reverse motion (left to right in FIGS. 3 to 6) or for operating the drive system to provide a braking effect to forward motion. The torque limiter 40 is engaged so that rotation of the input shaft 24 is prevented, and a torque below the torque threshold is applied to the input shaft 24 in the second direction (clockwise in FIG. 3) by the motor 20 via the gearbox 22. Since the input shaft 24 is prevented from rotating, the torque instead causes the housing 30 to pivot about the input shaft in the second direction, as indicated by the arrow in FIG. 5.

Figure 6:
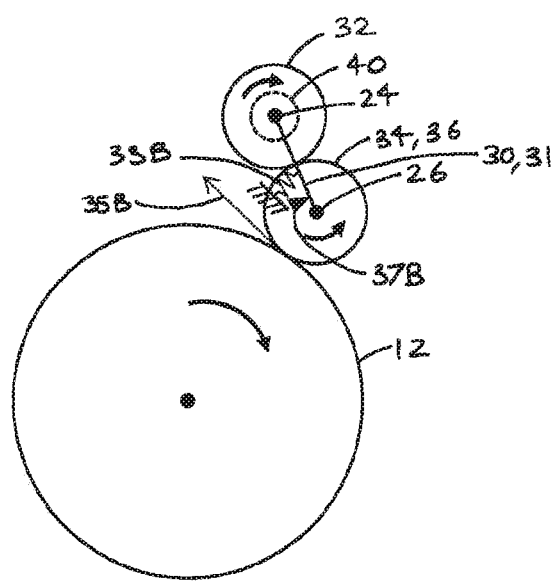

Gradually, the housing 30 pivots in the second direction to a position in which the drive pinion 36 is meshed with the driven gear 12, as shown in FIG. 6. This meshing position is different to the meshing position for providing forward motion. In this position the torque applied to the input shaft 24 by the motor 20 is increased to a level above the torque threshold so that the torque limiter 40 is disengaged and the input shaft 24 is able to rotate within the housing. As indicated by the arrows in FIG. 6, the rotation of the input shaft 24 in the second direction thus causes rotation of the input gear 32 in the second direction and rotation of the intermediate gear 34 and drive pinion 36 in the first direction (anti-clockwise in FIG. 6). Since the drive pinion 36 is meshed with the driven gear 12, a torque is applied to the driven gear 12—in the second direction to either provide reverse motion of the wheel 10 or to provide a braking torque to slow forward motion.

The meshing engagement is maintained because the resultant force derived from the engagement between the drive pinion 36 and the driven gear 12 provides a moment about the axis of the input shaft 24 in the second direction, which thus serves to urge the drive pinion 36 towards the driven gear 12. That is, the resultant force has a direction vector 35B which passes between the axis of the input shaft 24 and the axis of the driven gear 12 (or wheel 10) to provide the required moment. This moment is sufficiently large to overcome the opposite moment in the first direction which is provided by the spring 33B as it acts to urge the housing 30 to the neutral configuration, as shown in FIG. 6.

The distance between the axis of the drive pinion 36 and the driven gear 12 in the reverse driven configuration is controlled by a stop 37B, which prevents this axis centre distance from becoming too short. Without such control, jamming of the gears is possible.

Figure 7:
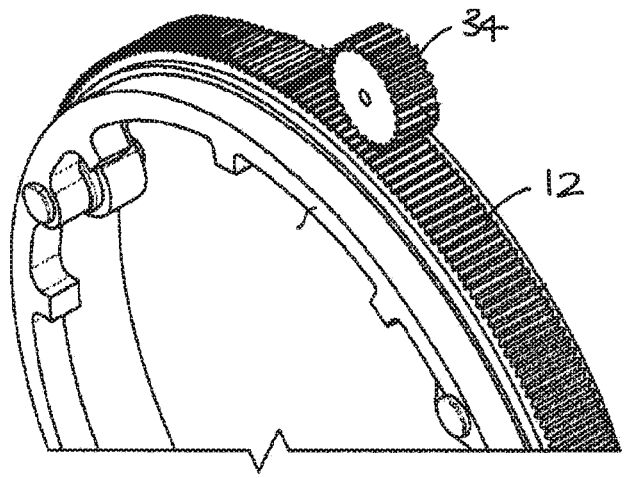
FIG. 7 shows a possible configuration for e pinion gear and driven gear of the second embodiment.

The second embodiment, as shown in FIG. 2, is very similar to the first embodiment, with description of common features not being repeated here. The key differences are that the driven gear 12 comprises a toothed spur gear, as shown in FIG. 7, and that the intermediate gear 36 (which is also a toothed spur gear, as described above) functions as the pinion gear 36 of the first embodiment in that it moves into and out of meshing engagement with the driven gear 12 in response to pivoting of the housing 30.

Another important difference is that in the second embodiment the housing 30 does not pivot about the input shaft 24, as in the first embodiment. Instead, the drive system of the second embodiment comprises a pivot support member 31 which is a rigid bracket which supports the input shaft 24 and the intermediate shaft 26 and which is able to pivot about the input shaft 24 within the housing 30. In alternative embodiments the housing may comprise two parts; a first part which encloses the input gear 32 and intermediate gear 34, supports the input shaft 24 and intermediate shaft 26, and pivots about the input shaft 24; and a second part which encloses the driven gear 12 and relative to which the first part can move.

The operation of the second embodiment is identical to the operation of the first embodiment described above, with the exception that it is the intermediate gear 34 which performs the tasks of the drive pinion 36 in meshing with the driven gear 12. Thus, the sequence of operation steps illustrated in FIGS. 3 to 6 and described above in relation to the first embodiment apply equally to the second embodiment, with the amendment that the intermediate gear 34 and drive pinion 36 are integrated in the same gear wheel, and in the second embodiment it is the pivot support member 31 which pivots about the input shaft 24 rather than the housing 30.

Although the illustrated embodiments show the input gear 32 and intermediate gear 34 as similarly sized, in some embodiments these gears may have different sizes in order to provide a gearing ratio. In particular, the intermediate gear 34 preferably has a larger diameter than the input gear 32 to provide a torque magnifying effect.

Although the invention has been described above with reference to one or more preferred embodiments, it will be appreciated that various changes or modifications may be made without departing from the scope of the invention as defined in the appended claims.

The invention claimed is:

1. A drive system for an aircraft landing gear having a wheel rotatable about a wheel axis, the drive system including:
    a driven gear arranged to be attached to the wheel so as to be capable of rotating the wheel about the wheel axis;
    a drive train comprising an input gear rotatable by an input shaft, an intermediate gear meshed with the input gear and rotatable by an intermediate shaft, and a support member arranged to support the input shaft and intermediate shaft and arranged to pivot about the input shaft between a neutral configuration in which the drive train is disengaged from the driven gear and a driven configuration in which the drive train is engaged with the driven gear to enable the drive train to rotate the driven gear;
    a brake capable of being engaged with the input shaft to prevent rotation of the input shaft relative to the support member and of being disengaged from the input shaft to permit rotation of the input shaft relative to the support member,
    wherein the support member is arranged to pivot from the neutral configuration to the driven configuration upon application of a first torque to the input shaft when the brake is engaged with the input shaft.

2. A drive system according to claim 1, wherein the brake is arranged to disengage from the input shaft upon application of a second torque to the input shaft, the second torque being higher than the first torque.

3. A drive system according to claim 1, wherein the brake comprises a torque limiter arranged to disengage from the input shaft upon application of a second torque higher than a threshold torque to the input shaft, wherein the first torque is lower than the threshold torque.

4. A drive system according to claim 1, wherein the support member is arranged to pivot about the input shaft between the neutral configuration, the driven configuration, and a reverse driven configuration in which the drive train is engaged with the driven gear to enable the drive train to rotate the driven gear in a reverse direction.

5. A drive system according to claim 1, including a pinion gear mounted on the intermediate shaft so as to be rotatable in tandem with the intermediate gear, the pinion gear being arranged to mesh with the driven gear in the driven configuration of the support member.

6. A drive system according to claim 5, wherein one of the pinion gear and the driven gear comprises a roller gear and the other of the pinion gear and the driven gear comprises a sprocket, the roller gear comprising a series of rollers arranged to form a ring, each roller being rotatable about a roller axis at a fixed distance from an axis of rotation of the drive pinion or driven gear, respectively.

7. A drive system according to claim 1, wherein the intermediate gear comprises a pinion gear arranged to mesh with the driven gear in the driven configuration of the support member.

8. A drive system according to claim 7, wherein the pinion gear and the driven gear each comprise a toothed spur gear.

9. A drive system according to claim 1, wherein the support member comprises a housing enclosing the input gear and intermediate gear.

10. An aircraft landing gear comprising a wheel and a drive system according to claim 1, wherein the driven gear of the drive system is attached to the wheel so that the wheel is arranged to rotate in tandem with the driven gear.

11. A method of operating a drive system of claim 1, the method including the sequential steps of:
    (i) preventing rotation of the input shaft;
    (ii) applying a first torque to the input shaft to cause the support member to pivot from the neutral configuration to the driven configuration; and
    (iii) enabling rotation of the input shaft to cause the drive train to rotate the driven gear.

12. A method according to claim 11, wherein step (iii) comprises applying a second torque to the input shaft in the driven configuration to enable rotation of the input shaft and thereby cause the drive train to rotate the driven gear, the second torque being higher than the first torque.

13. A method according to claim 11, including the further step of: ceasing to apply torque to the input shaft to cause the support member to pivot from the driven configuration to the neutral configuration.

14. A method according to claim 11, including the further step of:
    applying a third torque to the input shaft in a direction opposite to the first torque to cause the support member to pivot from the neutral configuration to a reverse driven configuration in which the drive train is engaged with the driven gear to enable the drive train to rotate the driven gear in a reverse direction.

\* \* \* \* \*